(12) United States Patent
Lundby et al.

(10) Patent No.: US 6,973,098 B1
(45) Date of Patent: Dec. 6, 2005

(54) METHOD AND APPARATUS FOR DETERMINING A DATA RATE IN A HIGH RATE PACKET DATA WIRELESS COMMUNICATIONS SYSTEM

(75) Inventors: Stein A. Lundby, Solana Beach, CA (US); Leonid Razoumov, San Diego, CA (US); Gang Bao, San Diego, CA (US); Yongbin Wei, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 1006 days.

(21) Appl. No.: 09/697,372

(22) Filed: Oct. 25, 2000

(51) Int. Cl.[7] .................................................. H04J 1/16
(52) U.S. Cl. .................... 370/491; 455/13.4; 455/226.1
(58) Field of Search ................................ 320/229–235, 320/332, 491, 500, 519; 455/67.11, 67.13, 455/67.14, 114.2, 115.1, 115.3, 226.1, 226.2, 455/226.3, 13.4; 370/229, 230, 310, 329, 370/331, 332, 333, 491, 516, 518, 519, 522, 370/500

(56) References Cited

U.S. PATENT DOCUMENTS

| | | | | |
|---|---|---|---|---|
| 5,862,453 A | * | 1/1999 | Love et al. | 455/69 |
| 6,188,906 B1 | * | 2/2001 | Lim et al. | 455/453 |
| 6,445,908 B1 | * | 9/2002 | Glazko | 455/255 |
| 6,456,652 B1 | * | 9/2002 | Kim et al. | 375/224 |
| 6,501,958 B1 | * | 12/2002 | Hwang et al. | 455/522 |
| 6,580,899 B1 | * | 6/2003 | Dalgleish et al. | 455/69 |
| 6,625,433 B1 | * | 9/2003 | Poirier et al. | 455/232.1 |
| 6,643,520 B1 | * | 11/2003 | Park et al. | 455/522 |
| 6,728,233 B1 | * | 4/2004 | Park et al. | 370/342 |

FOREIGN PATENT DOCUMENTS

| | | |
|---|---|---|
| WO | 9923844 | 5/1999 |
| WO | 0041542 | 7/2000 |

* cited by examiner

Primary Examiner—Dang Ton
Assistant Examiner—Phuc Tran
(74) Attorney, Agent, or Firm—Philip R. Wadsworth; Thien T. Nguyen

(57) ABSTRACT

In a wireless communication system a method for combination transmission of packet data and low delay data. In one embodiment a parallel signaling channel provides a message to receivers indicating a target recipient of packet data. The message also identifies the transmission channels used for packet data transmissions. Each receiver may then selectively decode only packets where the message identifies the receiver as a target recipient. The data packets stored in a buffer are ignored if the target recipient is another mobile unit. In one embodiment, the message is sent concurrently with the data packet on a parallel channel. In one embodiment, the message is punctured into the high rate packet data transmission.

19 Claims, 10 Drawing Sheets

METHOD AND APPARATUS FOR DETERMINING A DATA RATE IN A HIGH RATE PACKET DATA WIRELESS COMMUNICATIONS SYSTEM

REFERENCE TO RELATED CO-PENDING APPLICATIONS FOR PATENT

The present invention relates to the following U.S. application for patent:

U.S. patent application Ser. No. 08/963,386 entitled "METHOD AND APPARATUS FOR HIGH RATE PACKET DATA TRANSMISSION," filed on Nov. 3, 1997, now U.S. Pat. No. 6,574,211, issued Jun. 3, 2003 to Padovani et al., and assigned to the assignee hereof which is hereby expressly incorporated by reference herein;

U.S. patent application Ser. No. 09/697,375, filed Oct. 25, 2000, entitled METHOD AND APPARATUS FOR HIGH RATE PACKET DATA AND LOW DELAY DATA TRANSMISSIONS, and assigned to the assignee hereof.

FIELD

The present invention relates to wireless data communication. More particularly, the present invention relates to a novel and improved method and apparatus for high speed packet data and low delay data transmissions in a wireless communication system.

BACKGROUND

Increasing demand for wireless data transmission and the expansion of services available via wireless communication technology has led to the development of specific data services. One such service is referred to as High Data Rate (HDR). An exemplary HDR type system is proposed in "TL80-54421-1 HDR Air Interface Specification" referred to as "the HAI specification." HDR generally provides an efficient method of transmitting packets of data in a wireless communication system. A difficulty arises in applications requiring both voice and packet data services. Voice systems are considered low delay data systems, as the voice communications are interactive and therefore processed in real-time. Other low delay data systems include video, multimedia, and other real-time data systems. HDR systems are not designed for voice communications but rather are designed to optimize data transmissions, as the base station in an HDR system circulates through the various mobile users, sending data to only one mobile user at a time. The circulation introduces delay into the transmission process. Such delay is tolerable for data transmission, as the information is not used in real-time. In contrast, the circulation delay is not acceptable for voice communications.

There is a need for a combination system for transmitting high speed packet data information along with low delay data, such as voice information. There is a further need for a method of determining the data rate for high packet data rate information in such a combination system.

SUMMARY

The disclosed embodiments provide a novel and improved method for high packet data rate and low delay data transmission in a wireless communication system. In one embodiment, a base station in a wireless communication system first sets up low delay data transmission, effectively as high priority, and then schedules packet data services according to the available traffic power after satisfying the low delay data. The packet data service transmits the packet data to one mobile user at a time. Alternate embodiments may provide packet data to multiple mobile users at a time, dividing the available power among the multiple users. At a given time, one user is selected as a target recipient based on the quality of the channel. The base station determines a ratio of the available power to the pilot channel power and provides the ratio to the selected mobile user. The ratio is referred to as the "Traffic-to-Pilot" ratio, or "T/P" ratio. The mobile user uses the ratio to calculate a data rate and sends that information back to the base station.

In one embodiment, the base station provides a "Broadcast-to-Pilot" ratio, or "B/P" ratio to the mobile user, wherein the ratio considers the broadcast power, i.e., the total available transmission power, of the base station and the pilot power, i.e., the power portion of the broadcast power used for the pilot channel. The mobile user determines a normalized data rate to request from the base station, wherein the normalized data rate is a function of the B/P. The normalized data rate is sent to the base station and a decision made as to the appropriate data rate. The data rate selection is then sent to the mobile user.

In an exemplary embodiment, a parallel signaling channel is used to provide the T/P ratio information to the mobile user. The parallel signaling channel may be implemented using a separate carrier frequency, or by any of a variety of methods for generating a separate channel.

According to another embodiment, the T/P ratio is provided via the packet data traffic channel, wherein the T/P ratio is included in the header of a packet of data, or is provided continuously along with the packet data.

Alternate embodiments may implement another metric for estimating a SNR of the traffic channel based on the SNR of the pilot channel, wherein the metric is provided to the mobile user for determination of a data rate. The mobile user requests transmissions at or below the determined data rate.

In one aspect a wireless communication apparatus includes a first processor operative to receive a first indicator, the first indicator corresponding to available packet data transmission power; and a correlation unit operative to determine a packet data transmission rate indicator as a function of the first indicator and a received pilot signal strength.

In another aspect, in a wireless communication system, the system operative for transmitting packet data and low delay data, the system having a total available transmit power, a method includes establishing at least one low delay communication link using a first power; determining available packet data traffic power as a function of the total available transmit power and the first power; determining a packet data rate based on the available packet data traffic power.

In still another aspect, a wireless communication apparatus includes a first processor operative to receive a first indicator, the first indicator corresponding to a ratio of available traffic-to-pilot signal strength; a measurement unit operative to receive a pilot signal and determine a pilot signal-to-noise ratio of a pilot signal; a summation node coupled to the measurement unit and the first processor, the summation node operative to adjust the signal-to-noise ratio by the first indicator to form a traffic signal-to-noise ratio; and a correlation unit operative to receive the traffic signal-to-noise ratio and determine an associated data rate for transmission.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
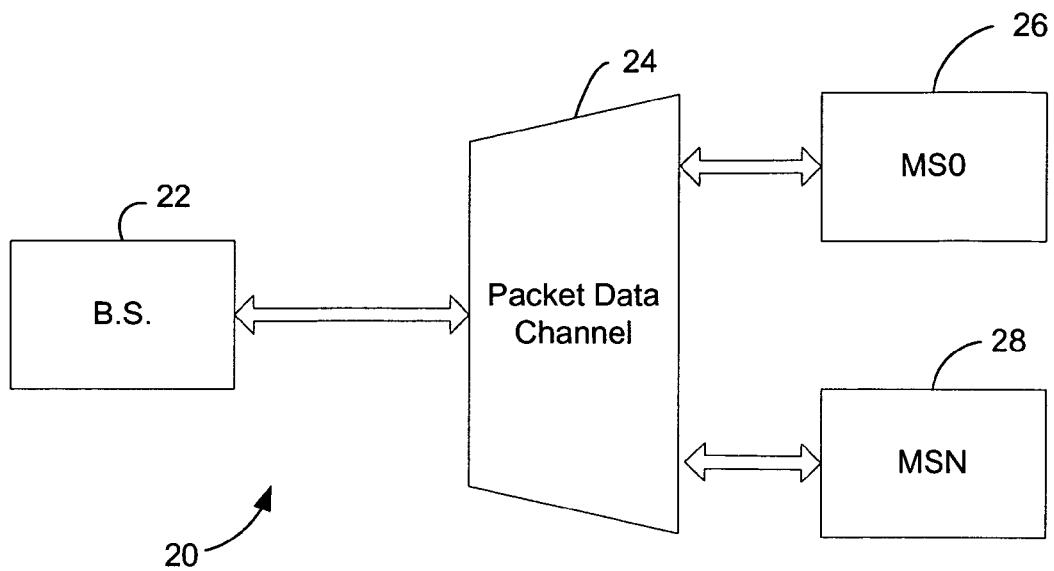
FIG. 1 illustrates in block diagram form one embodiment of a High Data Rate (HDR) protocol wireless communication system.

While it is desirable to implement high rate packet data services and low delay, voice type services in one system, this is a difficult task due to the significant differences between voice services and data services. Specifically, voice services have stringent and predetermined delay requirements. Typically, the overall one-way delay of speech frames must be less than 100 msec. In contrast to voice, the data delay can become a variable parameter used to optimize the efficiency of the data communication system. As the condition of a channel to a given user will vary over time, and it is therefore possible to select the better times to transmit packets based on the channel condition.

Another difference between voice and data services involves the requirement of voice services for a fixed and common grade of service (GOS) for all users. For example, in a digital system the GOS requires a fixed and equal transmission rate for all users having no delay greater than a maximum tolerable value for the frame error rate (FER) of the speech frames. In contrast, for data services, the GOS is not fixed, but rather may vary from user to user. For data services, the GOS may be a parameter optimized to increase the overall efficiency of the data communication system. The GOS of a data communication system is typically defined as the total delay incurred in the transfer of a predetermined amount of data hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

In contrast to voice and other low delay data communications, high data rate data communications typically use packet switched techniques rather than circuit switched techniques for transmission. The data is grouped into small batches to which control information is appended as header and/or tail. The combination of data and control information forms a packet. As packets are transmitted through a system various delays are introduced, and may even include loss of one or multiple packets and/or one or more portions of a packet. HDR and other packet data systems typically tolerate time varying delayed packets as well as lost packets. It is possible to exploit the delay tolerance of packet data systems by scheduling transmissions for optimum channel conditions. In one embodiment, the transmissions to multiple users are scheduled according to the quality of each of transmission link. The transmission uses all available power to transmit data to one of the multiple users at a time. This introduces a variable delay, as the multiple users may not have a priori knowledge of the target recipient, the scheduling of transmissions, the data rate, and/or the configuration information, including the modulation technique, the channel encoding, etc. In one embodiment, rather than have each receiver estimate such information, the receiver requests a data rate and corresponding configuration. The scheduling is determined by a scheduling algorithm and sent in a synchronization message.

Prior to requesting the data rate, the receiver determines an optimum data rate, wherein the data rate may be based on available transmission power. The data rate is proportional to the transmission power and the quality of the channel. As used herein, a combination system is a system capable of handling both low delay data transmissions and packet data transmission. In a combination system capable of handling voice and packet data transmissions, the available power, and thus the available data rate, varies with time with the voice activity. The receiver does not have knowledge of the voice activity of the system in determining a data rate. One example of a combination system is a Wideband Code Division Multiple Access, such as the "ANSI J-STD-01 Draft Standard for W-CDMA (Wideband Code Division Multiple Access) Air Interface Compatibility Standard for 1.85 to 1.99 GHz PCS Applications" referred to as "W-CDMA." Other systems include the "TIA/EIA/IS-2000 Standards for cdma2000 Spread Spectrum Systems" referred to as "the cdma2000 standard," or other per-user connection systems.

A packet data system 20 is illustrated in FIG. 1 consistent with the protocols defined by the HAI specification. In the system 20, a base station 22 communicates with mobile stations 26 through 28. Each mobile station 26–28 is identified by an index value from 0 to N, N being the total number of mobile stations within the system 20. The packet data channel 24 is illustrated as a multiplexor to illustrate the switchable connection. The base station 22 may be referred to as an "access point" for providing connectivity to users (i.e., mobile station or access terminal), specifically, one user at a time. Note that an access terminal is typically connected to a computing device, such as a laptop computer, or a personal digital assistant. An access terminal may even be a cellular telephone with web access capabilities. Similarly, the packet data channel 24 may be referred to as an "access network" for providing data connectivity between a packet switched data network and the access terminal device. In one example, the base station 22 connects mobile stations 26–28 to the Internet.

In a typical HDR system, packet data communications proceed with one link to the selected recipient, wherein packet data channel 24 schedules the various mobile stations 26–28 one at a time. Forward traffic channel refers to data transmitted from the base station, and reverse traffic channel refers to data transmitted from the mobile stations 26–28. The packet data system 20 schedules users by implementing one link to one user at a given time. This is in contrast to low delay data transmission systems where multiple links are maintained concurrently. The use of a single link allows a higher transmission data rate for the selected link and optimizes transmissions by optimizing the channel condition for at least one link. Ideally the base station only uses a channel when it is at an optimum condition.

The user(s) of mobile stations 26–28 that expect data service(s) provide a forward traffic channel data rate via a Data Rate Control (DRC) channel to the base station 22. The users are scheduled according to the quality of signal received, wherein scheduling also ensures that users are scheduled according to a fairness criteria. For example, a fairness criterion prevents the system from favoring those mobile users proximate to the base station over others that are distant. The requested data rate is based on the quality of signals received at the scheduled user. The ratio of the Carrier-to-Interference (C/I) is measured and used to determine a data rate for the communication.

Figure 2:
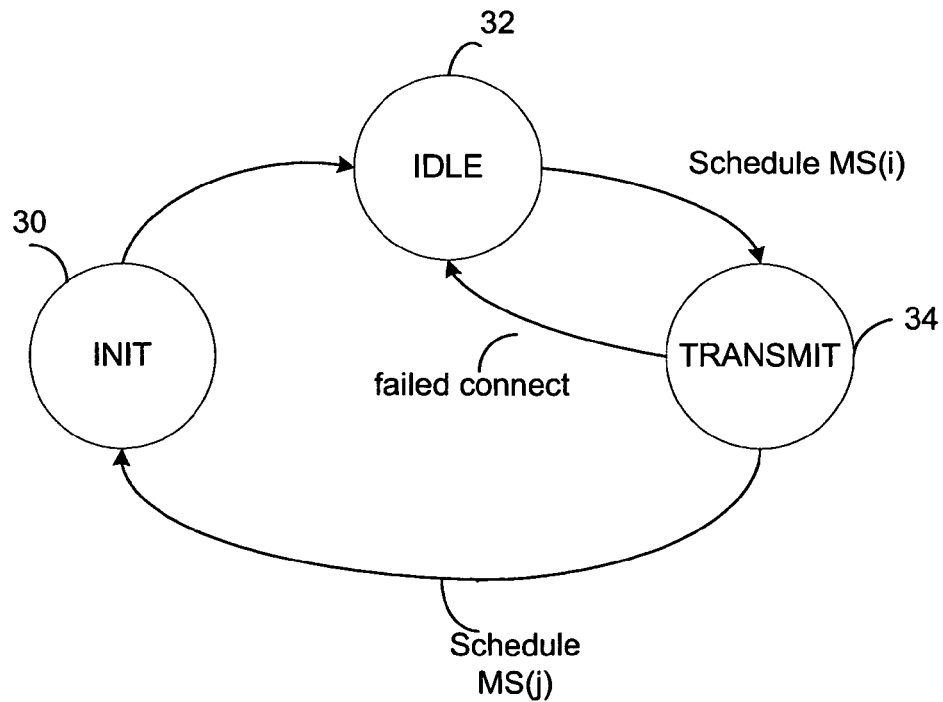
FIG. 2 illustrates a state diagram describing operation of an HDR system as in FIG. 1.

FIG. 2 illustrates a state diagram describing operation of the system 20 of FIG. 1, such as an HDR system operation consistent with the HAI specification. The state diagram describes operation with one mobile user, MSi. At state 30, labeled "INIT," base station 22 acquires access to packet data channel 24. During this states initialization includes acquiring a forward pilot channel and synchronizing control. Upon completion of the initialization, operation moves to state 32, labeled "IDLE." In the idle state, the connection to a user is closed, and the packet data channel 24 awaits further command to open the connection. When a mobile station, such as MSi, is scheduled, the operation moves to state 34, labeled "TRANSMIT." At state 34, the transmission proceeds with MSi, wherein MSi uses the reverse traffic channel, and the base station 22 uses the forward traffic channel. If the transmission or connection fails or the transmission is terminated, operation returns to IDLE state 32. A transmission may terminate if another user of mobile stations 26–28 is scheduled. If a new user outside of mobile stations 26–28 is scheduled, such as MSj, operation returns to INIT state 30 to establish that connection. In this way, the system 20 is able to schedule users 26–28 and also users connected through an alternate access network.

Figure 3:
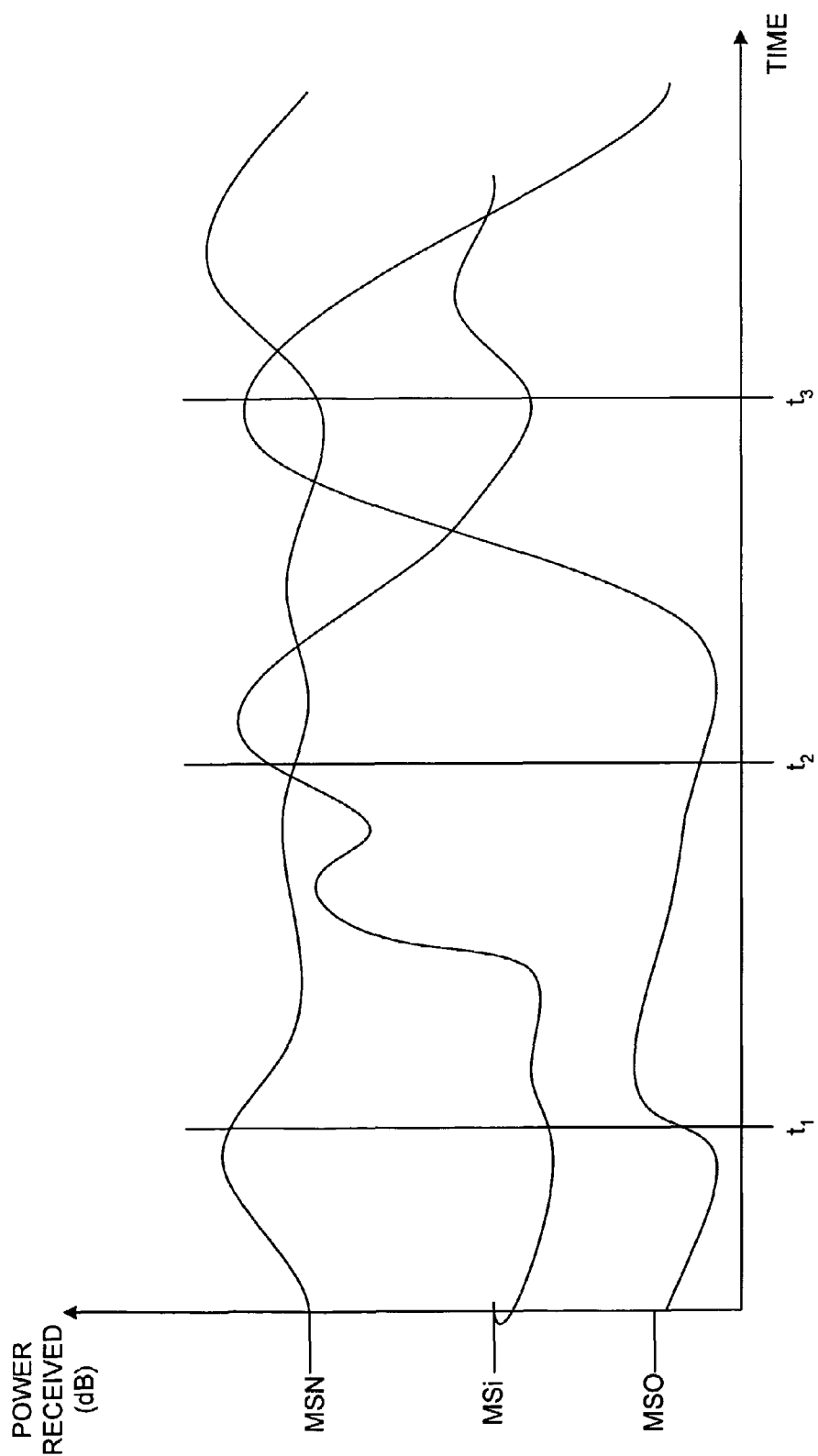
FIG. 3 illustrates in graphical form usage patterns for multiple packet data users within an HDR wireless communication system as in FIG. 1.

Scheduling users allows the system 20 to optimize service to mobile stations 26–28 by providing multi-user diversity. An example of the usage patterns associated with three (3) mobile stations MS0, MSi, and MSN within mobile stations 26–28 is illustrated in FIG. 3. The power received in dB at each user is graphed as a function of time. At time $t_1$ MSN receives a strong signal, while MS0 and MSi are not as strong. At time $t_2$ MSi receives the strongest signal, and at time $t_3$ MS0 receives the strongest signal. Therefore, system 20 is able to schedule communications with MSN around time $t_1$, with MSi around time $t_2$, and with MS0 around time $t_3$. The base station 22 determines the scheduling at least in part based on the DRC received from each mobile station 26–28.

Figure 4:
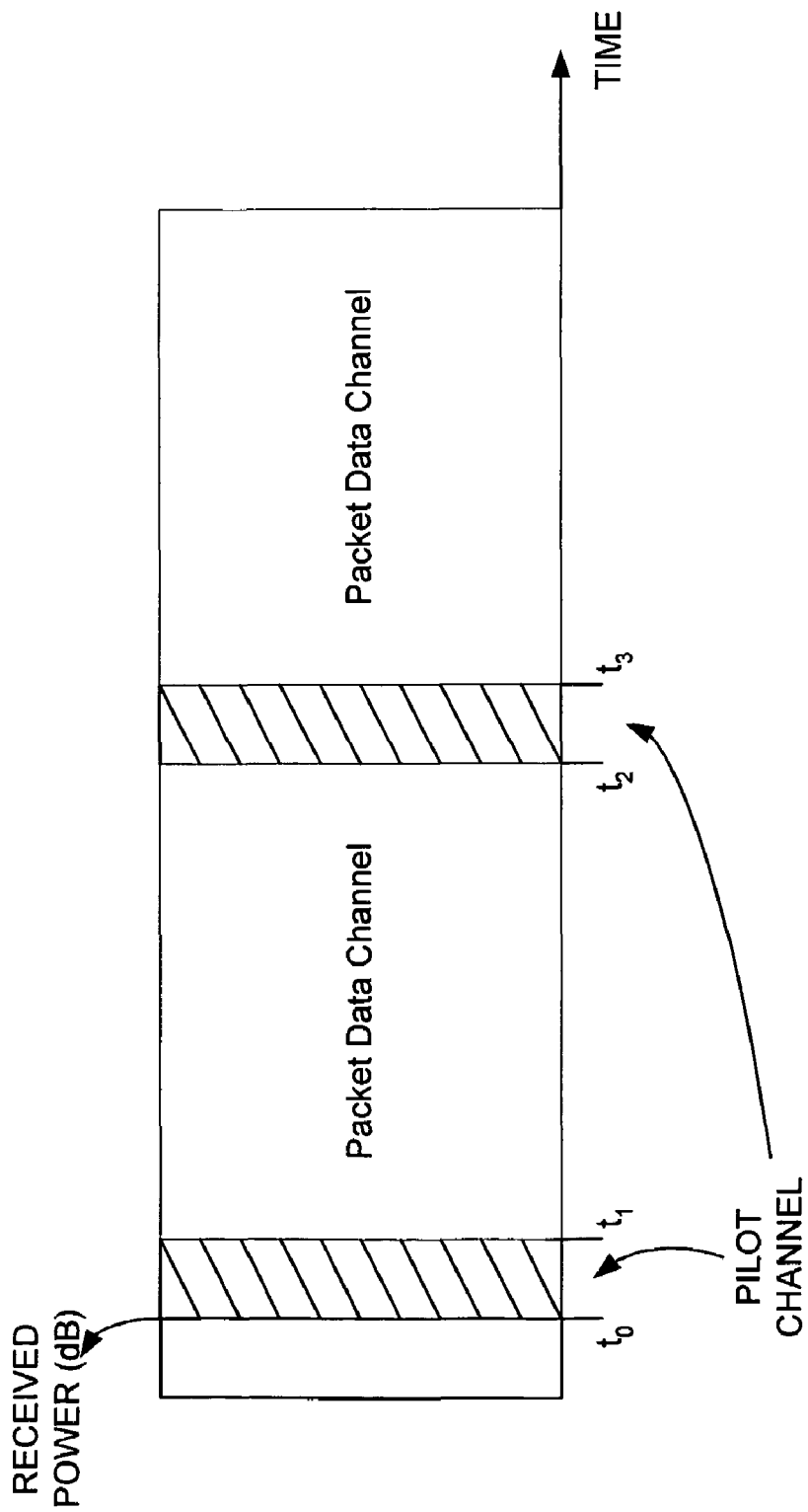
FIG. 4 illustrates in graphical form power received by a user within an HDR wireless communication system as in FIG. 1.

An exemplary HDR transmission within system 20 is illustrated in FIG. 4. Pilot channel transmissions are interspersed with the packet data channel. For example, the pilot channel uses all available power from time to $t_0$ $t_1$, and similarly from time $t_2$ to $t_3$. The packet data channel uses all available power from time $t_1$ to $t_2$, and from time $t_3$ etc. Each mobile station 26–28 calculates a data rate based on the total available power as used by the pilot channel. The data rate is proportional to the available power. When the packet data system 20 only transmits packetized data to mobile stations 26–28, the pilot channel accurately reflects the calculation of available power. However, when voice and other low delay data services are coupled within one wireless communication system, the calculation becomes more complex.

Figure 5:
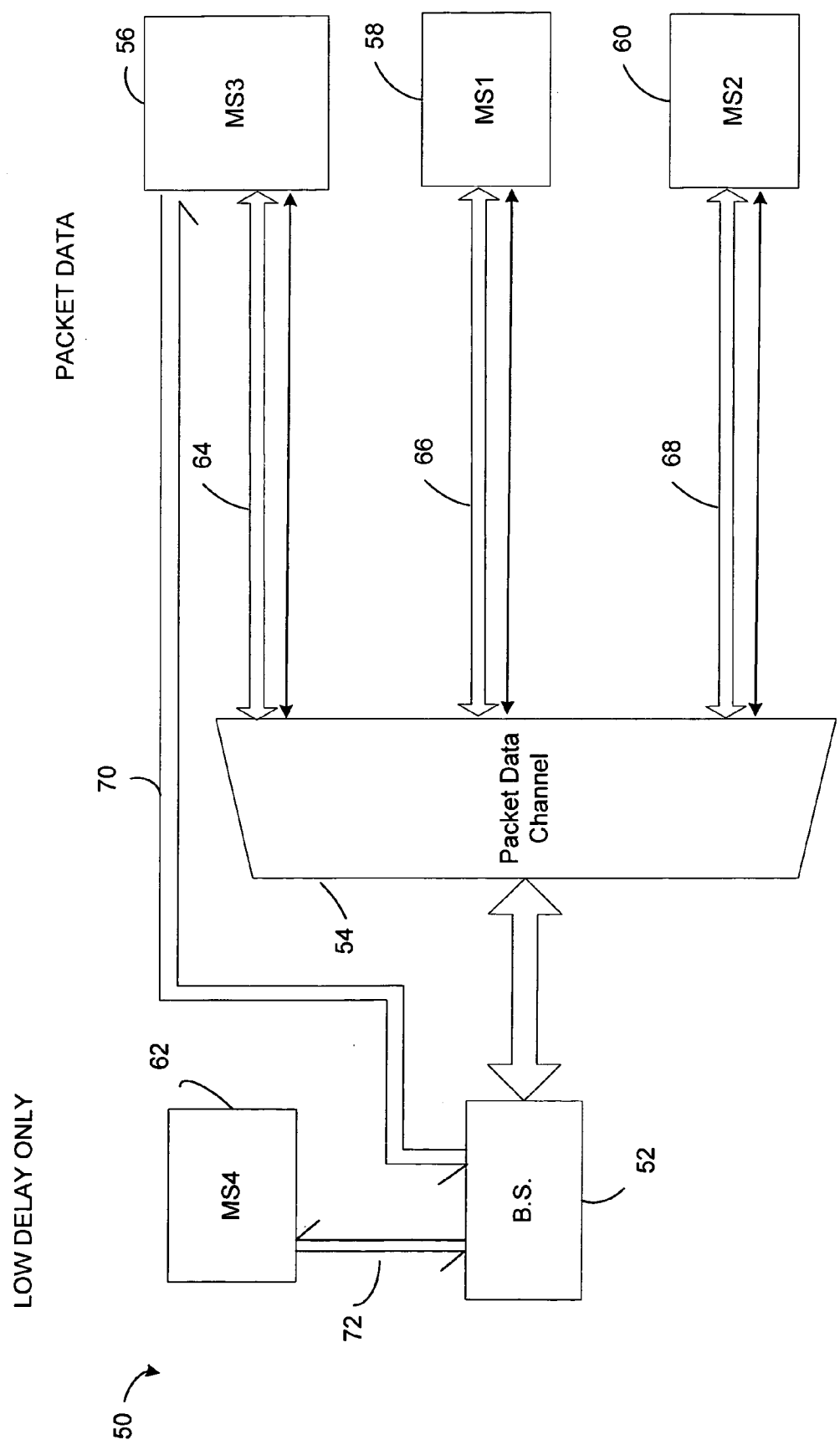
FIG. 5 illustrates in block diagram form an HDR wireless communication system including low delay data users according to one embodiment.

FIG. 5 illustrates a CDMA wireless communication system 50 according to one embodiment. The base station 52 communicates with multiple mobile users that may employ services including, but not limited to, low delay data-only services, such as voice services, low delay data and packet data services, and/or packet data-only services. The system implements a cdma2000 compatible protocol for transmitting packetized data services, which operates concurrently with a low delay data service. At a given time, the mobile stations 58 and 60 (MS1 and MS2) use only packet data services, the mobile station 56 (MS3) uses a packet data service and a low delay data service, and the mobile station 62 (MS4) uses only a voice service. The base station 52 maintains a communication link with MS4 62 via forward and reverse channels 72, and with MS3 56 via forward and reverse channels 70. For the HDR communications, the base station 52 schedules users for data communication via packet data channel 54. HDR communication with MS3 56 is illustrated through channel 64, with MS1 58 through channel 66, and with MS2 60 through channel 68. Each of the packet data service users provides data rate information to the base station 52 on respective DRCs. In one embodiment, the system 50 schedules one packetized data link during a given time period. In alternate embodiments, multiple links may be scheduled concurrently, wherein each of the multiple links uses only a portion of the available power.

Figure 6:
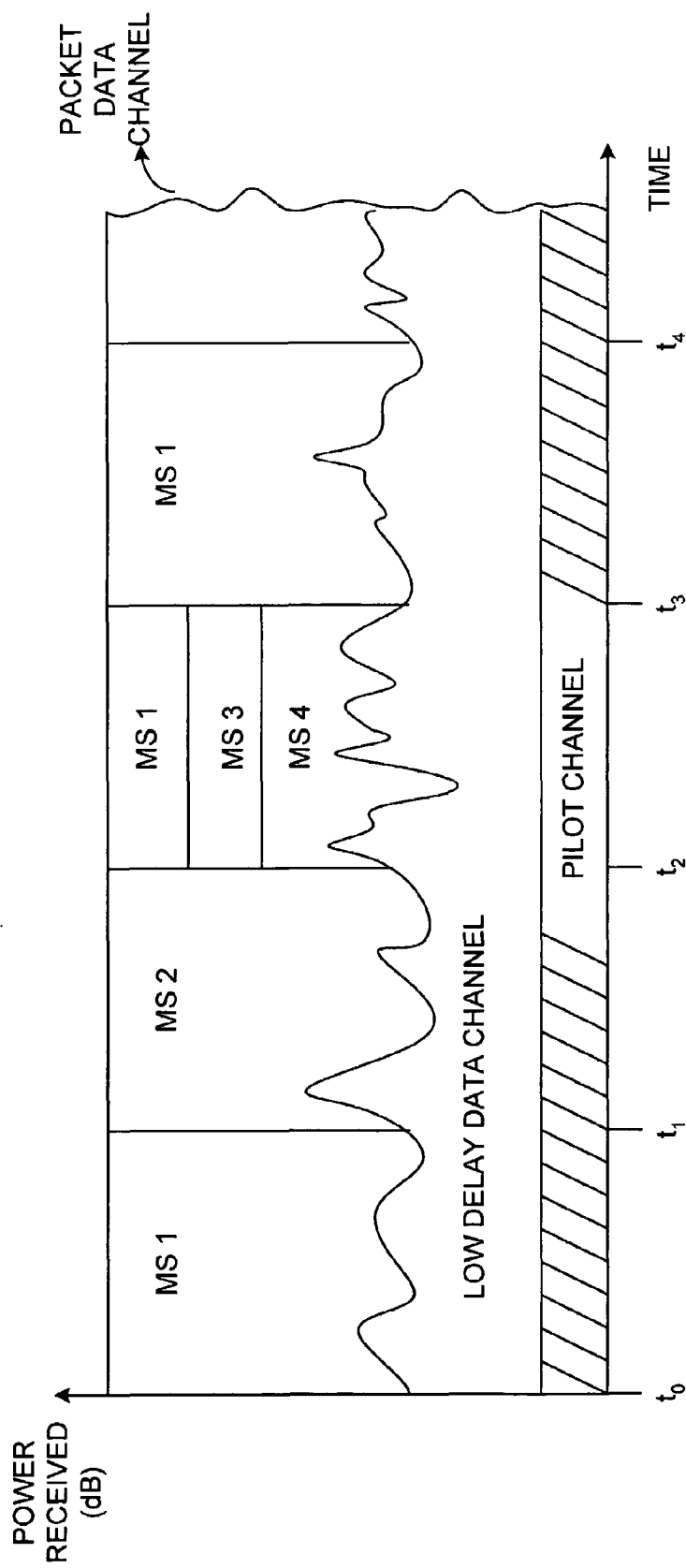
FIGS. 6–8 illustrate in graphical form power received by users in HDR wireless communication systems according to various embodiments.

Operation of the system 50 according to one embodiment is illustrated graphically in FIG. 6. The pilot channel is provided continuously, as is typical of low delay data systems. The power used by the low delay data channel varies continuously over time as transmissions are initiated, processed and terminated, and according to the specifics of the communications. The packet data channel uses the available power after the pilot channel and low delay data services are satisfied. The packet data channel is also referred to as a Pooled Supplemental Channel (PSCH), including resources of the system available after dedicated and common channels are allocated. As illustrated in FIG. 6, dynamic resource allocation involves pooling all unused power and spectrum spreading codes, such as Walsh codes, to form the PSCH. A maximum broadcast power is available with respect to the PSCH, which may be referred to as $I_{or}max$.

According to one embodiment, the PSCH channel format defines parallel sub-channels, each having a unique spectrum spreading code. One frame of data is then encoded, interleaved and modulated. The resultant signal is demultiplexed over the subchannels. At the receiver, the signals are summed together to rebuild a frame. A variable frame length-encoding scheme provides for longer frames at lower frame rates per slot. Each encoded packet is sliced into sub-packets, wherein each sub-packet is transmitted via one or multiple slots, providing incremental redundancy.

In contrast to FIG. 4, the addition of low delay data with the HDR transmissions introduces a variable floor for measuring the available power. Specifically, in a packet data-only system as illustrated in FIG. 4, all of the spread spectrum codes, such as Walsh codes, are available for use on the selected transmission link. When voice or low delay data services are added to the packet data services, the number of available codes becomes variable, changing with time. As the number of voice or low delay data services changes, the number of codes available for transmitting the data changes.

As illustrated in FIG. 6, MS1 is scheduled during the time period from $t_0$ to $t_1$, and MS2 from $t_1$ to $t_2$. During the time period from $t_2$ to $t_3$, multiple packetized data links are connected, including MS1, MS3 and MS4. During the time period form $t_3$ to $t_4$, MS1 is again scheduled alone. As illustrated, throughout the time periods $t_0$ to $t_4$, the power consumed by the low delay data channel varies continuously, impacting the power available for packetized data communications. As each mobile station calculates a data rate prior to receiving transmissions, a problem may occur during a transmission if the available power is reduced without a corresponding change in the data rate. To provide the mobile station(s) 56–60 with current information relating to the available power, the base station 52 determines a ratio of the available power to the pilot channel power. The ratio is referred to herein as the "traffic-to-pilot ratio", or "T/P ratio." The base station 52 provides this ratio to the scheduled mobile station(s) 56–60. The mobile station(s) 56–60 use the T/P ratio in conjunction with the SNR of the pilot channel, herein referred to as the "pilot SNR," to determine a data rate. In one embodiment the pilot SNR is adjusted based on the T/P ratio to calculate a "traffic SNR," wherein the traffic SNR is correlated to a data rate. The mobile station(s) 56–60 then transmit the data rate back to the base station 52 as a DRC data rate request.

Figure 7:
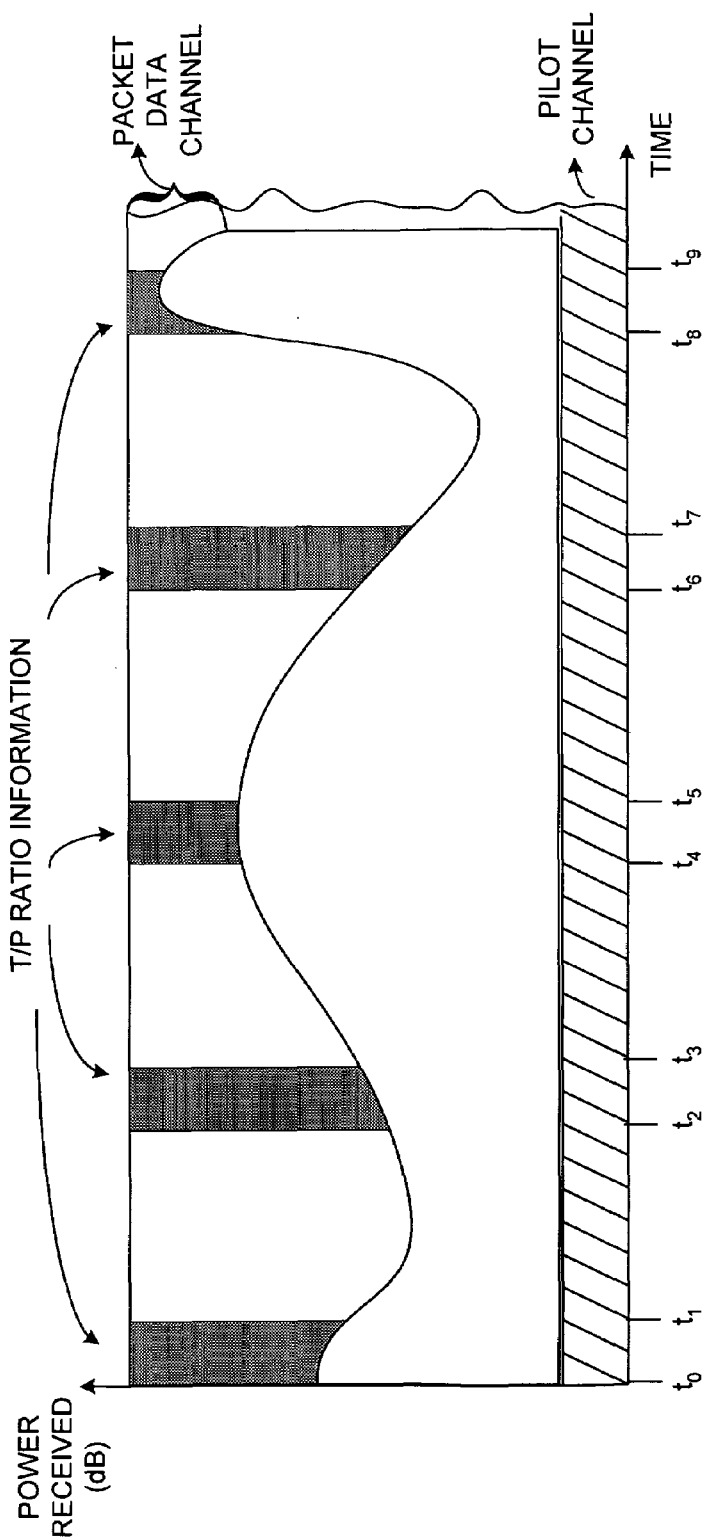

In one embodiment, the T/P ratio is included in the header of a packet of data or may be punctured or inserted into the high rate packet data channel between packetized data traffic. As illustrated in FIG. 7, the T/P ratio information is transmitted prior to traffic and provides the mobile station(s) 56–60 updated information regarding the available power as a result of changes in the low delay data channel. Such changes also impact the number of codes, such as Walsh codes, available for spreading the information signals. Less power available and fewer codes available results in a decreased data rate. For example, in one embodiment, the packetized data to a given user, or to all users if multiple packetized data links are available, is transmitted over channels corresponding to Walsh codes 16–19 in a CDMA system.

Figure 8:
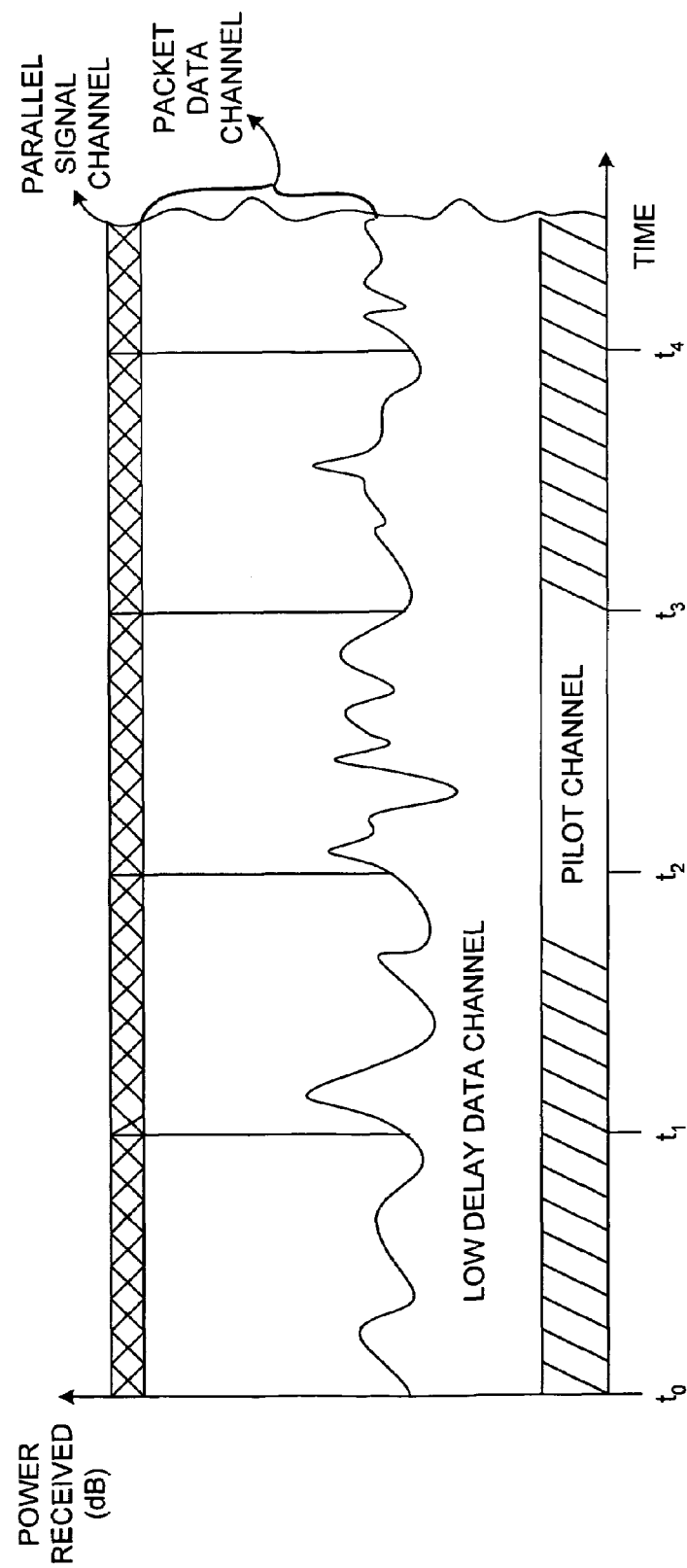

In an exemplary embodiment illustrated in FIG. 8, a parallel signaling channel is used to provide the T/P ratio information to the mobile user. The parallel signaling channel is a low rate channel carried by a separate Walsh code. The parallel signaling channel transmits the target recipient, the channels used for the traffic, as well as the type of coding used. The parallel signaling channel may be implemented using a separate carrier frequency, or by any of a variety of methods for generating a separate channel.

Note that the packet data to a particular user is transmitted on one or multiple pre-selected channels. For example, in one embodiment of a CDMA wireless communication system, Walsh codes 16 to 19 are assigned to data communications. In the exemplary embodiment illustrated in FIG. 8, a signaling message is transmitted on a separate channel having a low transmission rate. The signaling message may be sent concurrently with the data packet. The signaling message indicates the target recipient of the data packet, the transmission channels of the data packet, and well as the coding used. The signaling message may use a separate Walsh code or may be time multiplexed into the high rate data by puncture or insertion.

In one embodiment, the signaling message is encoded into a shorter frame than the frame of the data packet, such as the header, allowing the receiver to decode the signaling message and make processing decision(s) accordingly. The data received that is potentially targeted for the receiver is buffered awaiting the processing decision(s). For example, if the receiver is not the target recipient of the data, the receiver may discard the buffered data or may discontinue any preprocessing of data, such as buffering, etc. If the signaling channel contains no data for the receiver, the receiver discards the buffer, else, the receiver decodes the buffered data using the parameters indicated in the signaling message, reducing any latency of the system.

In one embodiment, the parallel signaling channel is transmitted to multiple users. As multiple users are able to distinguish between data to the various users, each of the multiple users is also able to receive a common packet(s) of data. In this way, the configuration information is provided via the signaling message and each user is able to retrieve and decode the packet(s). In one embodiment, a message is broadcast to multiple users, wherein a group identifier is also broadcast. Mobile users belonging to the group know the group identifier a priori. The group identifier may be placed in the header information. The group identifier may be a unique Walsh code or other means of identifying the group. In one embodiment, mobile user(s) may belong to more than one group.

Figure 9:
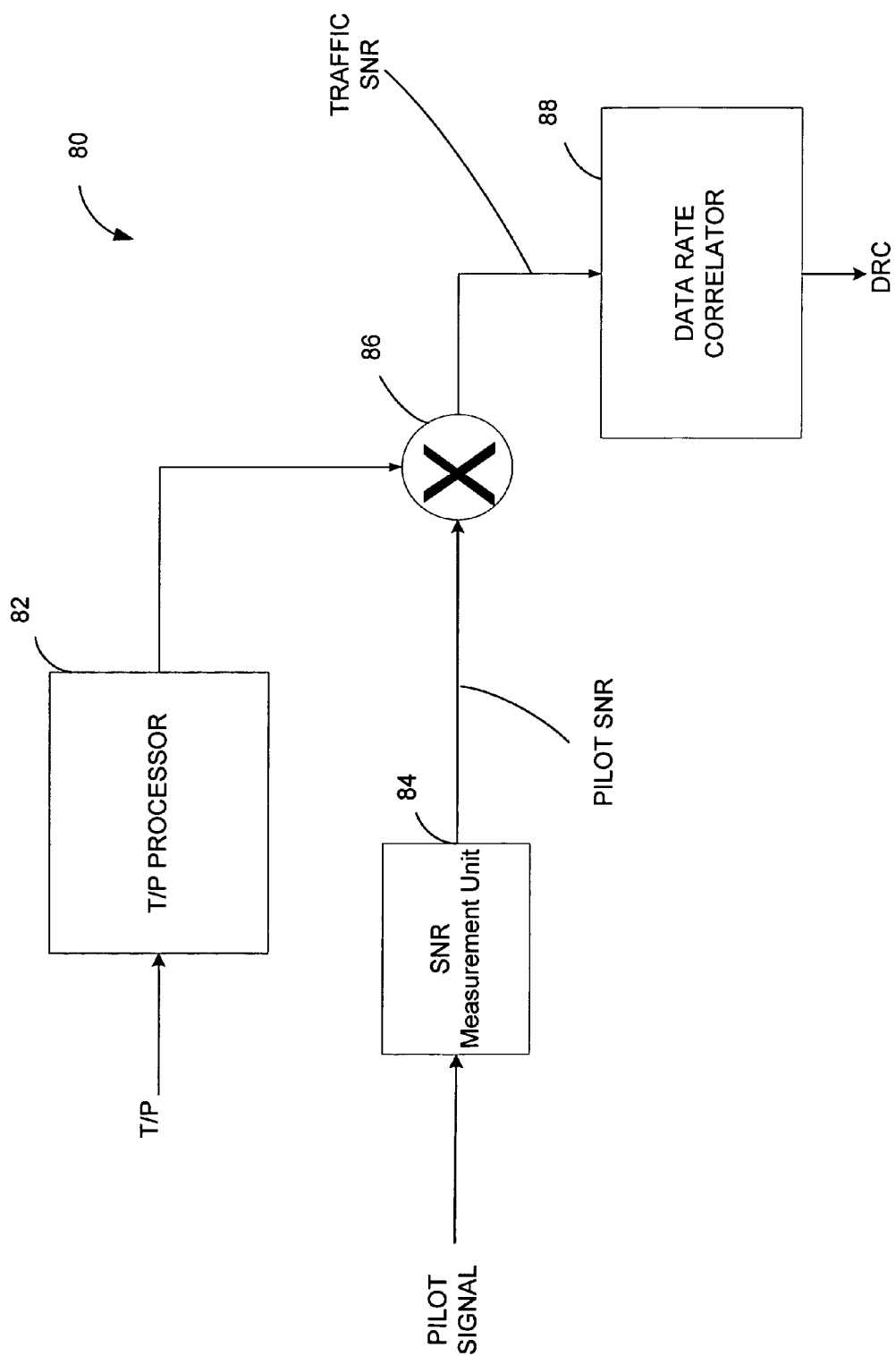
FIG. 9 illustrates in block diagram from a portion of a receiver in an HDR wireless communication system according to one embodiment.

FIG. 9 illustrates a portion of a mobile station 80 adapted for packetized data service within system 50. The T/P ratio information is provided to a T/P processor 82. The pilot signal is provided to SNR measurement unit 84 for calculation of the SNR of the received pilot signal. The output of the T/P ratio and the pilot SNR are provided to multiplier 86 to determine traffic SNR. The traffic SNR is then provided to the data rate correlator 88 that performs an adaptive mapping from the traffic SNR to an associated data rate. The data rate correlator 88 then generates the data rate for transmission via the DRC. The functions performed in this portion of the mobile station 80 may be implemented in dedicated hardware, software, firmware, or a combination thereof.

The T/P ratio may be transmitted using the parallel signaling channel as illustrated in FIG. 8. As the receiver will determine the data rate based on the T/P ratio, the signaling message may not include the data rate. The receiver then determines the arrival timing of data based on a transmitted synchronization message. In one embodiment, a separate signaling message is generated for the timing information. The signaling message is transmitted in parallel to the data. In an alternate embodiment, the signaling message(s) is punctured into the data.

Figure 10:
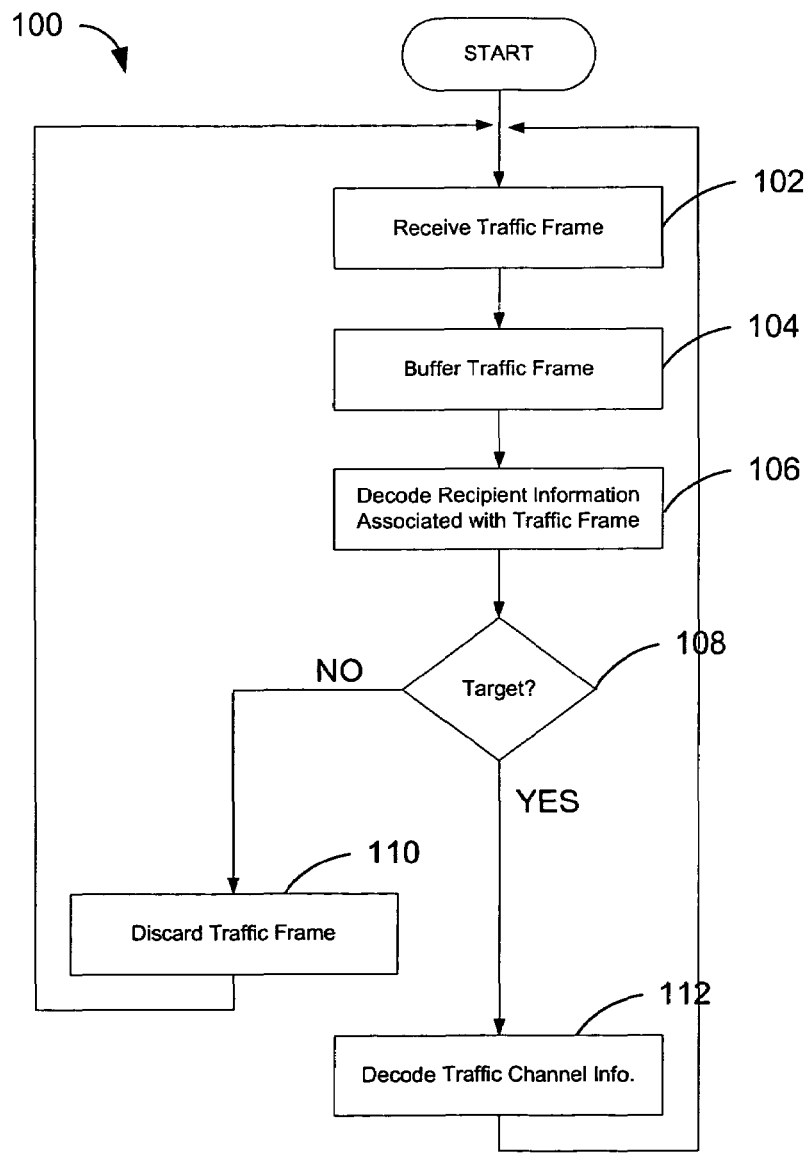
FIG. 10 illustrates in flow diagram for processing traffic data in a wireless communication system implementing a signaling channel according to one embodiment.

FIG. 10 illustrates a method 100 of processing data in a combination wireless communication system capable of packet data and low delay data transmissions according to one embodiment. The mobile station(s) receive a traffic frame, which is information received via the traffic channel, at step 102. The traffic frame is buffered at step 104. Buffering allows the mobile station(s) to handle the information at a later time without losing transmitted data. For example, data received may be buffered while other processing is performed. Or as applied in the present embodiment, the buffering delays processing of data until the mobile station(s) determines the target recipient of the data. Data targeted for other mobile stations are not processed, but rather are ignored saving valuable processing capability. When a mobile station(s) recognizes itself as a target recipient, the buffered data is available for retrieval and processing. The buffered data represents the received radio frequency samples. Alternate embodiments may determine a data rate for transmission without buffering information, wherein the data received is processed without being first stored in a buffer.

Continuing with FIG. 10, the mobile station(s) decode recipient information associated with the traffic frame at step 104. At decision diamond 108 the process determines if a given mobile user matches the target recipient. If there is no match, the process continues to step 110 to discard the buffered traffic frame. Processing then returns to step 102 to receive the next traffic frame. If the mobile user matches the target recipient, then the traffic channel frame is decoded at step 112 and the process returns to step 102. The ability to decode a small portion of the transmission and avoid unnecessary decoding and processing increases the efficiency of operation for a mobile user and reduces the power consumption associated therewith.

Figure 11:
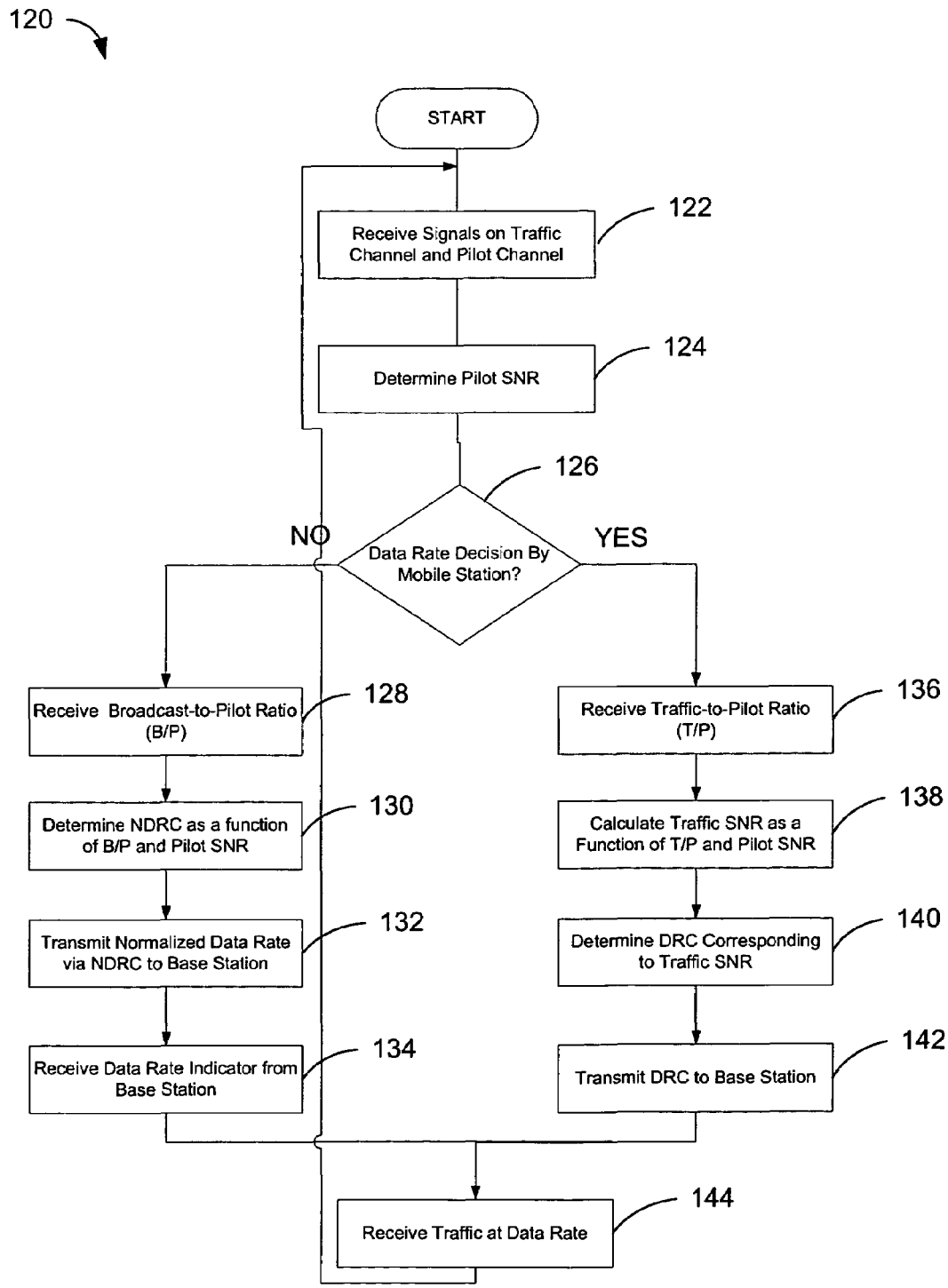
FIG. 11 illustrates in flow diagram for determining a data rate for transmission in a wireless communication system according to one embodiment.

FIG. 11 illustrates various methods of determining a data rate in a combination wireless communication system according to one embodiment. The mobile station(s) receives signals via traffic and pilot channels at step 122. The mobile station(s) determines a "pilot SNR" based on the received pilot signal at step 124. In the present embodiment, the pilot signal is transmitted on a unique channel designated for pilot transmission. In alternate embodiments, the pilot signal may be punctured into one or more other transmissions on one or more other channels. In one embodiment, the pilot signal is transmitted at a predetermined frequency different from the frequency of the traffic channel. For packet data transmissions the base station and each mobile station determine a data rate for transmission. In one embodiment the base station determines the data rate and informs the mobile station. In another embodiment, the mobile station determines the data rate and informs the base station. In still another embodiment, the base station and mobile station negotiate a data rate, wherein each provides information to the other. The decision diamond 126 separates the process flow according to where the data rate decision is made. If the mobile station makes the data rate decision, processing continues to step 136. If the mobile station does not make the data rate decision, processing continues to step 128.

In one embodiment, the method for determining a data rate involves negotiation of the mobile station and base station. In the negotiations, the mobile station determines a maximum achievable data rate. The maximum achievable data rate represents a data rate possible if the mobile station is the only receiver of the base station. In this case, the total transmit power available from the base station is dedicated to the mobile station. As illustrated, at step 128 the mobile station receives a Broadcast-to-Pilot ratio, or B/P ratio. The broadcast power is the total transmit power of the base station. The pilot power is the power consumed for transmission of the pilot signal from the base station. The mobile station determines a normalized data rate as a function of the B/P ratio and the pilot SNR at step 130. The normalized data rate corresponds to a data rate the mobile user would request if all of the broadcast power were available for data traffic to the mobile user and the pilot signal, ignoring other users within a system such as system 50 of FIG. 5. In other words, the normalized data rate is the maximum achievable data rate. The normalized data rate is then transmitted to the base station via the Normalized Data Rate Channel (NDRC) at step 132. The base station receives the NDRC from each mobile station and determines corresponding data rates for each mobile user. The data rate indicator is then transmitted to each mobile station at step 134. Processing then continues to step 144 and the mobile receives traffic at the data rate, and finally returns to step 122.

The B/P ratio represents a constant that will typically vary relatively slowly over time. The base station knows the ratio of total broadcast power and the power used for the pilot channel. Alternate embodiments may implement other indicators of the available power, such as using other expression(s) of the energy of transmitted signals, the power spectral density of the signals, etc.

Continuing with FIG. 11, in an alternate method of determining a data rate, the data rate decision is made by the mobile station. For this embodiment, at step 136 the mobile station receives a Traffic-to-Pilot ratio, T/P ratio. At step 138 the mobile station uses the calculated pilot SNR to generate a "traffic SNR" by adjusting the pilot SNR according to the power available for traffic transmissions. In the present embodiment the T/P ratio is used to adjust the pilot SNR. The traffic SNR then reflects the estimated SNR of the traffic transmissions using the available power. The traffic SNR is correlated to a data rate at step 140. The traffic SNR may be correlated to a Carrier-to-Interference (C/I) ratio or other indicator of the quality of the channel. In one embodiment a lookup table stores traffic SNRs and associated data rates. The data rate is then provided as a request to the base station on the Data Request Channel (DRC) at step 142. Processing then continues to step 144.

In an alternate embodiment, the mobile station estimates the T/P ratio using the received pilot signal. The received pilot signal provides a channel estimate used for decoding the traffic information. A low pass filter may be used to filter noise components from the received pilot signal. The filtering provides an estimate of the noise received with the pilot signal. The T/P ratio is then estimated based on the filtering results. As an example, consider a system model described by the following:

$$r_k^t = \sqrt{T}\, cs_k + n_k^t \qquad (1)$$
$$r_k^p = \sqrt{P}\, c + n_k^p \qquad \text{for } k = 0, 1, \ldots, M-1.$$

wherein $r_k^t$ and $r_k^p$ are the traffic and pilot signals, respectively, received at a mobile station. The channel gain, c is complex. The noise associated with the traffic and pilot are given as $n_k^t$ and $n_k^p$ respectively. The lumped power for the pilot and traffic are given as P and T, respectively. As described $T=E_c^t G_t$ and $P=E_c^p G_p$, wherein $E_c^t$ and $E_c^p$ represent the energy per chip for the traffic and pilot channels, respectively, and wherein $G_t$ and $G_p$ are the corresponding processing gains. Note that noises $n_k^t$ and $n_k^p$ are considered independent due to the orthogonality between different code channels, both with zero mean and variance $N_t$. For the above described system model, an estimate of the traffic-to-pilot ratio is given as:

$$R = \sqrt{\frac{T}{P}}. \quad (2)$$

The Maximum Likelihood (ML) estimate of the traffic-to-pilot ratio may be found using the following estimate:

$$\hat{R} = \frac{\left|\left(\frac{1}{M}\sum_{k=0}^{M-1} s_k^* r_k^t\right)^2 + \left(\frac{1}{M}\sum_{k=0}^{M-1} r_k^p\right)^2\left(\frac{1}{M}\sum_{k=0}^{M-1} |s_k|^2\right)\right| +}{2\operatorname{Re}\left[\left(\frac{1}{M}\sum_{k=0}^{M-1} s_k^* r_k^t\right)\left(\frac{1}{M}\sum_{k=0}^{M-1} r_k^p\right)^*\right]\left(\frac{1}{M}\sum_{k=0}^{M-1} |s_k|^2\right)} \quad (3)$$

After some approximation, (3) reduces to:

$$\hat{R} \approx \left|\frac{1}{M}\sum_{k=0}^{M-1} s_k^* \frac{r_k^t}{\frac{1}{M}\sum_{m=0}^{M-1} r_m^p}\right| \times \frac{1}{\frac{1}{M}\sum_{k=0}^{M-1} |s_k|^2} \approx \left|\frac{1}{M}\sum_{k=0}^{M-1} s_k^* \frac{r_k^t}{\frac{1}{M}\sum_{m=0}^{M-1} r_m^p}\right|, \quad (4)$$

wherein the constellation is assumed to have unit averaged power.

The estimates in (3) and (4) may be difficult to evaluate, as the data sequence $\{S_k\}$, representing the transmitted signal, is included in the equations.

However, these equations suggest that $$r_k^t \bigg/ \frac{1}{M}\sum_{m=0}^{M-1} r_m^p$$

is a sufficient statistic that may be used in T/P ratio estimation algorithm design.

According to one embodiment, an algorithm for estimating the T/P ratio first estimates $h = \sqrt{Pc}$ with $$\hat{h} = \frac{1}{M}\sum_{m=0}^{M-1} r_m^p$$

and the noise variance $N_t$ from $r_k^p$.

Next the algorithm defines an estimate of the T/P ratio as:

$$\hat{R} = \sqrt{\frac{1}{M}\sum_{k=0}^{M-1}\left|\frac{r_k^t}{\hat{h}}\right| - \frac{\hat{N}}{|\hat{h}|}} \quad (5)$$

$$= \sqrt{\frac{1}{M}\sum_{k=0}^{M-1}\left|\frac{r_k^t}{\frac{1}{M}\sum_{m=0}^{M-1} r_m^p}\right|^2 - \frac{\hat{N}_t}{\left|\frac{1}{M}\sum_{m=0}^{M-1} r_m^p\right|^2}},$$

wherein the estimate of (5) is asymptotically unbiased. Note that an optimal estimate considers the first moment of the test statistics, while the estimate of (5) intends to estimate the second order moment. While both approaches result in unbiased estimates, the second order moment will typically introduce a larger estimation variance. Consider also that using the first order moment, the required data sequence is unavailable, and the mobile station uses a priori the specific format of the constellation.

In another embodiment, a T/P ratio estimation algorithm estimates $h = \sqrt{Pc}$ with $$\hat{h} = \frac{1}{M}\sum_{m=0}^{M-1} r_m^p$$

and obtains the empirical probability density function (PDF) of $$x_k = r_k^t \bigg/ \frac{1}{M}\sum_{m=0}^{M-1} r_m^p.$$

Note that, for sufficiently large M, $x_k$ can be considered approximately Gaussian with mean $Rs_k$. It is then possible to extract an estimate of R from the PDF of $x_k$. At this point there are a variety of ways to estimate R from the PDF of $x_k$. Several properties can be used in extracting the traffic-to-pilot ratio from the PDF. For example, for a high-order modulation such as associated with a high SNR, $x_k$'s are grouped into several clusters. The layout of the centers of the clusters is similar to that of the constellation of $s_k$. For M-PAM, M-QAM and M-PSK, the constellation points are equally spaced. Note also that the distribution of each cluster approximately follows the Gaussian PDF. With source coding, such as compression and/or vocoding, and channel coding the transmitted symbols are equally likely.

The algorithm may continue in the frequency domain or the time domain. For a frequency domain analysis, the points of a constellation may be arranged equally spaced, as are the clusters of the PDF of $X_k$, indicating the PDF is periodic. The space, or period, is then determined by frequency domain analysis. For example, creating a histogram by calculating the DFT of the PDF function, the algorithm then locates the major period. R may be calculated based on the major period and the period between any two constellation points. For M-QAM, the two-dimensional PDF function can be considered as two separate one-dimensional functions. Alternately, the equal spacing property may be exploited in the time domain. For example, by calculation of the auto-correlation function of the PDF, the position of the first side-lobe next to zero offset may provide an estimate of the average period between the center of the two adjacent clusters.

In still another embodiment, the N centers of the clusters of the PDF are first located. This method assumes that the estimated centers are $\{d_k\}$ for k=0, 1, ..., N−1, and the constellation points $\{a_k\}$ for k=0, 1, ..., N−1, are in a same order. Application of the least square algorithm results in the following estimate of R $$\hat{R} = \frac{\left| \text{Re}\left[ \frac{1}{N} \sum_m a_m d_m^* \right] \right|}{\frac{1}{N} \sum_m |a_m|^2} = \left| \text{Re}\left[ \frac{1}{N} \sum_m a_m d_m^* \right] \right| \quad (6)$$

Note that the centers for the PDF function may be determined in a variety of ways.

Since the constellation points are equally likely, the method first finds the Cumulative Probability Function (CDF) from the PDF. The clustering is performed by application of a threshold scheme on the CDF. The center of each group is then calculated by averaging within the group using a first order moment. In alternate embodiments, techniques such as feature extraction used in image processing may be applied, wherein for example, a feature may be a peak or a template based on an approximation to the Gaussian PDF. Note also that image segmentation techniques, such as clustering and region growing, provide methods for grouping the points of the empirical PDF. Comparing (6) and (4) illustrates a similarity between clustering processes and hard-decoding, wherein the actual signal $s_k$ in (4) is replaced by the hard-decoded symbol am in (6).

In a typical HDR system, such as system 20 illustrated in FIG. 1, one link is established between the base station at a time. In one embodiment, a wireless communication system is extended to support multiple users at one time. In other words, system 50 of FIG. 5 allows the base station 52 to transmit data to multiple data users of mobile units 56, 58, and 60, concurrently. Note that while four (4) mobile units are illustrated in FIG. 5, there may be any number of mobile units within system 50 communicating with base station 52. Extension to multiple users provides for multiple communications via the packet data channel 54. At a given time, the users supported by the packet data channel are referred to as "active receivers." Each active receiver decodes the signaling message(s) to determine the T/P ratio of the packet data channel 54. Each active receiver processes the T/P ratio without consideration of the potential for other active receiver(s). The base station receives data rate requests from each active receiver and allocates power proportionally.

Returning to FIG. 1, in a conventional HDR communication system, much information is known a priori, including but not limited to, constellation information, encoding scheme, channel identification, and power available for transmission of packet data. Constellation information refers to the modulation scheme with which the digital data information is modulated onto a carrier for transmission. Modulation schemes include, but are not limited to, Binary Phase-Shift Keying, Quadrature Phase-Shift Keying (QPSK), Quadrature Amplitude Mapping (QAM), etc. The encoding scheme encompasses aspects of coding the source information into a digital form, including, but not limited to, Turbo-coding, convolutional coding, error coding, such as Cyclic Redundancy Check (CRC), rate sets, etc. The receiver via the DRC may request the constellation and encoding information. Channel identification includes, but is not limited to, spreading codes in a spread spectrum communication system, such as Walsh codes, and may include the carrier frequency. The channel identification may be predetermined and fixed. The transmission power available for packet data transmission is typically known, based on the known total transmit power available and the known pilot signal power.

In a combination, packet data and low delay data, system some of the above mentioned information is not known a priori, but rather is subject to variation due to the sharing of the available power and available channels with low delay data, such as voice communications. A comparison is made in the following table.

TABLE 1

Information Available in HDR Systems

| INFORMATION | HDR PACKET DATA ONLY | COMBINATION T/P | COMBINATION SIGNALING CHANNEL |
|---|---|---|---|
| Target Recipient | DECODE packet | DECODE packet | Message |
| Constellation | DRC | DRC | DRC |
| Encoding | DRC | DRC | DRC |
| Channel(s) | FIXED | Unknown | Message |
| Traffic Power for Data | FIXED | T/P | Unknown |

The use of a signaling channel, as illustrated in FIG. 8, provides much of this information to the receiver. The message identifies the target recipient(s) and the channel(s) for the packet data transmission. The DRC information requests a data rate, specifying the constellation and the encoding. The provision of the available traffic power indicator, wherein in one embodiment the indicator is a ratio of the available traffic power to the pilot signal strength, provides a measure for determining the data rate. According to one embodiment implementing a separate parallel signaling channel, the information related to target recipient, constellation, and encoding is transmitted via the traffic channel and/or DRC, while the information relating to channel(s) and traffic power for data is transmitted via the parallel signaling channel.

Application of the embodiments and combinations of embodiments described hereinabove, allow for combination of packet data with low delay data transmissions within a wireless communication system. As indicated, the combination of voice with packet data introduces variables into the transmission process. The application of a separate signaling channeling provides information to receivers within a wireless communication system without degrading the quality of the communication. The signaling channel message may identify target recipient(s) information. The transmission of an available traffic indicator to a receiver provides information that assists the receiver in determining a data rate to request from the transmitter. Similarly, when the traffic indicator is used by multiple receivers, wherein each calculates a data rate therefrom, the transmitter receives information that assists the transmitter in allocating transmission channels for packet data transmissions to the multiple receivers.

Thus, a novel and improved method and apparatus for high data rate transmission in a wireless communication system has been described. While the exemplary embodiment discussed herein describes a CDMA system, various embodiments are applicable to any wireless per-user connection method. To effect efficient communications, the exemplary embodiment is described with respect to HDR, but may also be efficient in application to IS-95, W-CDMA, IS-2000, GSM, TDMA, etc.

Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a Digital Signal Processor (DSP), an Application Specific Integrated Circuit (ASIC), a Field Programmable Gate Array (FPGA) or other programmable logic device, discrete gate or transistor logic, discrete hardware components such as, e.g., registers and First In First Out (FIFO) type, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in Random Access Memory (RAM), FLASH memory, Read Only Memory (ROM), Electrically Programmable ROM (EPROM), Electrically Erasable Programmable ROM (EEPROM), registers, hard disk, a removable disk, a Compact Disk-ROM (CD-ROM), or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A wireless communication apparatus, comprising:
   a first processor operative to receive a first indicator, the first indicator corresponding to available packet data transmission power, which is equal to total transmit power from a base station to the wireless communication apparatus minus power used for low delay data transmission and pilot signal transmission, wherein low delay data comprises at least one of voice and video; and
   a correlation unit operative to determine a packet data transmission rate indicator as a function of the first indicator and a signal strength of a pilot signal received from the base station.

2. The wireless communication apparatus of claim 1, wherein the first indicator corresponds to a ratio of available packet data transmission power-to-pilot channel power.

3. The wireless communication apparatus of claim 2, wherein the pilot signal strength is a measure of a signal-to-noise ratio of the pilot signal.

4. The wireless communication apparatus of claim 3, further comprising:
   an adjustment node coupled to the first processor and the correlation unit, the adjustment node operative to adjust the signal-to-noise ratio of the pilot signal in response to the ratio of available packet data transmission power-to-pilot channel power to determine a signal-to-noise ratio for packet data transmissions.

5. The wireless communication apparatus of claim 1, wherein the apparatus is operative to transmit the packet data transmission rate indicator via a data rate request channel to the base station.

6. The wireless communication apparatus of claim 1, wherein the correlation unit selects the packet data transmission rate indicator from a set of data transmission rates corresponding to a set of traffic signal-to-noise ratios.

7. The apparatus of claim 6, wherein the packet data transmission rate indicator is a data rate defined by constellation and encoding type.

8. The wireless communication apparatus of claim 1, wherein the apparatus is operative within a wireless communication system supporting packet data transmissions and low delay data transmissions.

9. The apparatus of claim 1, wherein the first indicator is transmitted on a separate parallel signaling channel from the base station to the apparatus.

10. The apparatus of claim 9, wherein the first indicator is sent concurrently with a data packet from the base station to the apparatus.

11. The apparatus as in claim 9, wherein the first indicator indicates a target recipient of a data packet.

12. The apparatus of claim 9, wherein the first indicator indicates transmission channels of a data packet.

13. The apparatus of claim 9, wherein the first indicator indicates a coding type.

14. The wireless communication apparatus of claim 1, further comprising a receiver operable to receive packet data and low delay data on code division multiple access (CDMA) channels from the base station.

15. In a wireless communication system, the system operative for transmitting packet data and low delay data to mobile stations, the system having a total available transmit power, a method comprising:
   establishing at least one low delay data communication link between a base station and a mobile station using a pilot signal with a first transmit power, wherein low delay data comprises at least one of voice and video;
   determining available packet data traffic power as a function of the total available transmit power, a low delay data transmit power, and the first transmit power; and
   determining a packet data transmission rate based on the available packet data traffic power.

16. The method of claim 15, wherein the at least one low delay data communication is a voice communication.

17. The method of claim 15, wherein the step of determining the available packet data traffic power, further comprises:
   determining a traffic-to-pilot ratio of the total available transmit power to the first transmit power.

18. The method of claim 17, wherein the step of determining a packet data transmission rate further comprises:
   estimating a signal-to-noise ratio of the packet data traffic by adjusting the signal-to-noise ratio of the pilot signal according to the traffic-to-pilot ratio.

19. A wireless communication apparatus, comprising:
   a first processor operative to receive a first indicator, the first indicator corresponding to a ratio of available traffic-to-pilot power;

a measurement unit operative to receive a pilot signal and determine a pilot signal-to-noise ratio of the pilot signal;

a summation node coupled to the measurement unit and the first processor, the summation node operative to adjust the pilot signal-to-noise ratio by the first indicator to form a traffic signal-to-noise ratio; and a correlation unit operative to receive the traffic signal-to-noise ratio and determine a data rate for packet data transmission from a base station to the wireless communication apparatus.

* * * * *